United States Patent
Yoshida et al.

(10) Patent No.: US 9,209,538 B2
(45) Date of Patent: Dec. 8, 2015

(54) MEMORY CARD CONNECTOR

(71) Applicant: KYOCERA Connector Products Corporation, Kanagawa (JP)

(72) Inventors: Kazuta Yoshida, Kanagawa (JP); Yoshifumi Okabe, Kanagawa (JP); Hidehiro Nakamura, Kanagawa (JP)

(73) Assignee: KYOCERA Connector Products Corporation, Yokohama-shi, Kanagawa (JP)

( * ) Notice: Subject to any disclaimer, the term of this patent is extended or adjusted under 35 U.S.C. 154(b) by 78 days.

(21) Appl. No.: 14/162,143

(22) Filed: Jan. 23, 2014

(65) Prior Publication Data
US 2014/0213116 A1 Jul. 31, 2014

(30) Foreign Application Priority Data

Jan. 28, 2013 (JP) .................................. 2013-12820

(51) Int. Cl.
*H01R 24/00* (2011.01)
*H01R 12/71* (2011.01)
*H01R 25/00* (2006.01)
*G06K 7/00* (2006.01)

(52) U.S. Cl.
CPC ............ *H01R 12/714* (2013.01); *H01R 25/006* (2013.01); *G06K 7/0021* (2013.01)

(58) Field of Classification Search
USPC .............. 439/629, 630, 631, 946, 541.5, 152, 439/159; 361/752, 796
See application file for complete search history.

(56) References Cited

U.S. PATENT DOCUMENTS

| 7,871,298 B2 * | 1/2011 | Guo et al. ...................... 439/630 |
| 8,469,747 B2 * | 6/2013 | Huang ........................... 439/629 |
| 2010/0105247 A1 * | 4/2010 | Guo et al. ...................... 439/630 |
| 2010/0144179 A1 | 6/2010 | Guo et al. |
| 2011/0003496 A1 * | 1/2011 | Hu ................................ 439/159 |

FOREIGN PATENT DOCUMENTS

| JP | 2001357917 | 12/2001 |
| JP | 2003-323943 | 11/2003 |
| JP | 2005173943 | 6/2005 |

* cited by examiner

*Primary Examiner* — Abdullah Riyami
*Assistant Examiner* — Harshad Patel
(74) *Attorney, Agent, or Firm* — McCormick, Paulding & Huber LLP (57) ABSTRACT

A memory card connector includes first and second connectors including first and second housings having first and second storage sections, respectively, and first and second contacts which connect with terminals of first and second memory cards removably-inserted into the first and second storage sections, respectively. The first and second connectors are superposed on each other in a direction of thickness thereof. Each first contact includes a first tail which is mountable to a circuit board and positioned on an outer peripheral side of a first side surface of the first housing. The second housing includes a second side surface located at a different position from the first side surface as viewed in the thickness direction. Each second contact includes a second tail which is mountable to the circuit board and positioned on an outer peripheral side of the second side surface.

6 Claims, 7 Drawing Sheets

MEMORY CARD CONNECTOR

CROSS REFERENCE TO RELATED APPLICATION

The present invention is related to and claims priority of the following co-pending application, namely, Japanese Patent Application No. 2013-12820 filed on Jan. 28, 2013.

BACKGROUND OF THE INVENTION

1. Field of the Invention

The present invention relates to a connector into which memory cards, such as micro-SD cards, SIM-cards and micro-SIM cards, are removably insertable, and in particular, relates to a memory card connector into which two memory cards are removably insertable.

2. Description of Related Art

This type of memory card connector known in the art is disclosed in, e.g., Japanese Unexamined Patent Publication 2003-323943.

The memory card connector disclosed in the above-mentioned publication is constructed of a first connector and a second connector which are superposed on each other in the direction of thickness thereof.

The first connector has a first housing and a first group of contacts. The first housing is rectangular in overall shape and has a first storage slot (storage section) into which a first memory card is removably insertable, and the first group of contacts are electrically connected with terminals of the first memory cards inserted into the first storage slot. On the other hand, the second connector has a second housing and a second group of contacts. The second housing is identical in overall shape to the first housing and has a second storage slot (storage section) into which a second memory card is removably insertable, and the second group of contacts are electrically connected with terminals of the second memory cards inserted into the second storage slot.

Each contact of the first group of contacts of the first connector has a first tail which is mountable to a circuit board and positioned on the outer peripheral side of a first side surface serving as one side of the first housing, as viewed in the direction of thickness of the first and second connectors. In addition, the second housing has a first side surface (parallel to the aforementioned first side surface of the first housing) that is positioned on the same side as the first side surface of the first housing, and the second group of contacts of the second connector has a second tail which is mountable to the aforementioned circuit board and positioned on the outer peripheral side of the first side surface of the second housing as viewed in the aforementioned direction of thickness of the first and second connectors.

Some of the first tails of the first group of contacts of the first connector and some of the second tails of the second group of contacts of the second connector are alternately arranged (along the longitudinal direction of the first side surfaces of the first housing and the second housing).

The first connector and the second connector are mountable to a circuit board. More specifically, with a circuit board, the first connector and the second connector being superposed in that order, the first connector and the second connector can be mounted to the circuit board by soldering the first tails, which are formed at ends of the first group of contacts, and the second tails, which are formed at ends of the second tails of the second group of contacts, to the circuit board.

Since some of the first tails of the first group of contacts of the first connector and some of the second tails of the second group of contacts of the second connector are alternately arranged, the distance between any two adjacent first and second tails (i.e., the pitch of the alternately-arranged first and second tails) is extremely small. Therefore, the mountability of the first tails and the second tails to a circuit board easily deteriorates. In other words, positions (images) of the first and second tails are difficult to recognize by an image recognizer, and accordingly, defective soldering easily occurs between each of the first and second tails and the circuit board.

In addition, since the first tails (first contacts) of the first connector and the second tails (second contacts) of the second connector which are alternately arranged are mutually different in shape, it is difficult to make an alignment adjustment for the first tails and the second tails with respect to the circuit board (i.e., to make an adjustment to make the first tails and the second tails lie in a plane). In other words, a difference (difference in level) easily occurs between the distance (clearance) (in the direction of thickness of the circuit board) between the first tails and the circuit board and the distance (clearance) (in the direction of thickness of the circuit board) between the second tails and the circuit board. If such a difference occurs, the tails (the first tails or the second tails) of one of the first connector and the second connector come in contact with the circuit board, whereas the tails (the first tails or the second tails) of the other connector are inevitably spaced from the circuit board, so that there is a possibility of defective soldering occurring between the tails of the aforementioned other connector and the circuit board when the spaced distance (separated distance) therebetween is great.

Additionally, in the case where the memory card connector (a memory card) is small in size, if it is attempted to arrange the first tails and the second tails alternately, the distance between any two adjacent first and second tails (i.e., the pitch of the alternately-arranged first and second tails) would be extremely small, which makes it difficult to mount the first tails and the second tails onto the circuit board. Consequently, it is difficult to apply the technical idea disclosed in the aforementioned Japanese Unexamined Patent Publication 2003-323943 to a small-sized memory card connector.

Additionally, in order to alternately arrange some of the first tails of the first group of contacts of the first connector and some of the second tails of the second group of contacts of the second connector, it is sometimes the case that either the first tails or the second tails are each required to be formed into a complicated shape (e.g., a crank shape), which easily causes the production cost thereof to increase.

SUMMARY OF THE INVENTION

The present invention provides a memory card connector in which, although the memory card connector is structured such that the first connector and the second connector are superposed on each other, the mountability of the first tails of the first connector and the second tails of the second connector to a circuit board is favorable and the production cost can be kept low even when the memory card connector is small in size.

According to an aspect of the present invention, a memory card connector is provided, including a first connector including a first housing having one of a square and rectangular shape and provided with a first storage section, into which a first memory card is removably insertable, and first contacts which are electrically connected with terminals of the first memory card inserted into the first storage section; and a second connector including a second housing having one of a square and rectangular shape and provided with a second storage section, into which a second memory card is removably insertable, and second contacts which are electrically connected with terminals of the second memory card inserted into the second storage section. The first connector and the second connector are superposed on each other in a direction of thickness thereof. Each the first contacts includes a first tail which is mountable to a circuit board and which is positioned on an outer peripheral side of a first side surface that serves as one side of the first housing as viewed in the thickness direction. The second housing includes a second side surface which is located at a different position from the first side surface as viewed in the thickness direction. Each second contact includes a second tail which is mountable to the circuit board and which is positioned on an outer peripheral side of the second side surface as viewed in the thickness direction.

It is desirable for the second side surface to be orthogonal to the first side surface as viewed in the thickness direction.

It is desirable for the circuit board, the first connector and the second connector to be superposed in that order, wherein the first storage section and the second storage section are provided with a first opening and a second opening which are formed in surfaces of the first housing and the second housing on a common side, respectively, the first memory card and the second memory card being removably insertable into the first storage section and the second storage section through the first opening and the second opening, respectively. The first housing is provided with the first side surface at a different position from the first opening as viewed in the thickness direction. A pair of the second side surfaces, of the second housing, are located at different positions from the first and second openings and the first side surface as viewed in the thickness direction.

It is desirable for the memory card connector to include a locking apparatus which engages with both the first housing and the second housing to hold the first connector and the second connector in a mutually superposed state.

The memory card connector can be incorporated in an electronic device.

In the memory card connector according to the present invention, the first tail of each first contact of the first connector is positioned on the outer peripheral side of the first side surface, which serves as one side of the first housing, as viewed in the thickness direction of the memory card connector, while the second tail of each second contact of the second connector is positioned on the outer peripheral side of the second side surface, which is located at a different position from the first side surface, as viewed in the thickness direction of the memory card connector.

Accordingly, the pitch (distance) between the first tails and the pitch (distance) between the second tails can be made (relatively) wide. Therefore, positions (images) of the first tails and the second tails become easy to recognize by an image recognizer, so that defective soldering does not easily occur between each of the first and second tails and the circuit board.

Additionally, since the first tails and the second tails are mounted on the circuit board at different positions (not alternately arranged), the first tails and the second tails are not easily influenced by each other. This makes it relatively easy to make alignment adjustments for the first tails and the second tails with respect to the circuit board, thus reducing the possibility of defective soldering occurring between each of the first and second tails and the circuit board.

Additionally, since the first tails and the second tails are not alternately arranged, the pitch (distance) between the first tails and the pitch (distance) between the second tails do not become narrow even if the memory card connector is small in size.

Therefore, according to the present invention, the mountability of the first tails and the second tails to the circuit board is satisfactory even when the memory card connector is small in size.

As viewed in the direction of thickness of the memory card connector, the first tails of the first contacts and the second tails of the second contacts are located at different positions (the first tails and the second tails are not alternately arranged), and accordingly, one of each first tail and each second tail does not need to be formed into a complicated shape (e.g., a crank shape).

BRIEF DESCRIPTION OF THE DRAWINGS

The present invention will be discussed below in detail with reference to the accompanying drawings, in which.

DESCRIPTION OF THE EMBODIMENT

An embodiment of a memory card connector according to the present invention will be hereinafter discussed with reference to FIGS. 1 through 14. In the following descriptions, forward and rearward directions, upward and downward directions, and leftward and rightward directions are determined with reference to the directions of the double-headed arrows shown in the drawings.

The present embodiment of the memory card connector 10 can be installed in, e.g., a mobile device (electronic device) such as a mobile phone or a tablet computer, etc., and a first memory card MCa and a second memory MCb card, each of which is configured as a micro-SIM card, can be removably inserted into the memory card connector 10.

The memory card connector 10 is provided with a first connector 11 and a second connector 70, which constitute major elements of the memory card connector 10.

First, the detailed structure of the first connector 11 will be discussed hereinafter.

The first connector 11 is provided with a first lower housing (first housing) 15, a slider 40, a cam bar 55, a first upper housing (first housing) 60 and a compression coil spring S1.

The first lower housing 15 is substantially rectangular in a plan view and formed as a integrally-formed product including a first metal member 16 and a first insulator 26.

Figure 8:
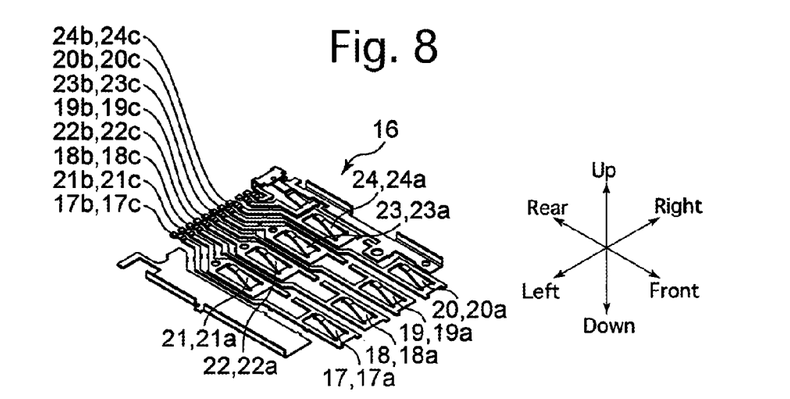
FIG. 8 is a perspective view of a first metal member provided as an element of the first connector, viewed obliquely from above.

As shown in FIG. 8, the first metal member 16 is provided with eight first contacts 17, 18, 19, 20, 21, 22, 23 and 24, and the eight first contacts 17, 18, 19, 20, 21, 22, 23 and 24 are integrally provided with eight first contact leaves 17a, 18a, 19a, 20a, 21a, 22a, 23a and 24a and eight first tails 17b, 18b, 19b, 20b, 21b, 22b, 23b and 24b, respectively. The rear ends of the eight first tails 17b, 18b, 19b, 20b, 21b, 22b, 23b and 24b constitute eight first mounting portions 17c, 18c, 19c, 20c, 21c, 22c, 23c and 24c that are located one step down from portions of the eight first tails 17b, 18b, 19b, 20b, 21b, 22b, 23b and 24b immediately in front of the first mounting portions 17c, 18c, 19c, 20c, 21c, 22c, 23c and 24c, respectively.

The first insulator 26 is integrated with the first metal member 16 by performing outsert molding on the first metal member 16 in an injection molding die not shown in the drawings. The bottom of the first metal member 16 (except the first tails 17b through 24b) and the bottom of the first insulator 26 lie in a plane (see FIGS. 2 and 5). The first insulator 26 is provided with left and right side walls 27, a bottom-forming portion 28, a cam-bar support portion 32 and a rear wall 34. The bottom-forming portion 28 forms the bottom of the first lower housing 15. The first insulator 26 is further provided at both the left and right ends of the rear wall 34 with a pair of first positioning projections 34a, respectively, which project upward.

The bottom-forming portion 28 is provided with a total of eight contact exposing holes 29, through which the first contact leaves 17a through 24a are exposed, respectively. The cam-bar support portion 32, which constitutes the front end of the left side portion of the first lower housing 15, is provided with a cam-bar support groove 33 which is recessed downward on a top surface thereof. The rear wall 34, which constitutes the rear end of the first lower housing 15, is provided with a spring support projection 35 which projects forward on the left side portion thereof. In addition, a left side portion of the bottom-forming portion 28 forms a slide groove 37 which is one step down from the periphery thereof. As shown in the drawings, the internal space of the first lower housing 15 is formed as a first storage slot (storage section) 38 which is surrounded by the left and right side walls 27, the bottom-forming portion 28 and the rear wall 34. Each of the left and right side walls 27 is provided on the outer side thereof with a front and rear pair of upper-cover lock projections 30. Additionally, the first insulator 26 is provided on the left and right side walls 27 and the rear wall 34 with a total of five connector coupling projections 31; more specifically, each of the left and right side walls 27 is provided on the outer side thereof with two (front and rear) connector coupling projections 31, and the rear wall 34 is provided on the rear side thereof with one connector coupling projection 31. The first insulator 26 is provided at each of the front left corner and the front right corner thereof with a clearance recess 39. The first insulator 26 is further provided on the upper surface of the front left corner thereof with a front-side positioning projection 39a which projects upward.

As shown in the drawings, the first insulator 26 is substantially rectangular in shape in a plan view, the outer sides of the left and right side walls 27 are parallel to each other, and the rear surface of the rear wall 34 is orthogonal to the left and right side walls 27. The first tails 17b through 24b (the first mounting portions 17c through 24c) of the eight first contacts 17 through 24 are positioned on the outer peripheral side of the rear surface (first side surface) of the rear wall 34 in a plan view (as viewed in the direction of thickness of the first connector 11).

The slider 40 is an integrated combination of a slider body 41 and a reinforcing member 50.

The slider body 41 is made of a heat-resistant synthetic resin, extends in the forward/rearward direction, and is provided with a linear portion 42 and a contact terminal 43. The lower end of the linear portion 42 is slidably engaged in the slide groove 37, and the contact terminal 43 projects rightward from the rear end of the linear portion 42.

The slider 40 is provided on the front of the upper surface of the linear portion 42 with a heart-shaped cam groove having a substantially heart shape in a plan view. The heart-shaped cam groove 44 is formed around a heart-shaped protrusion 45. The heart-shaped cam groove 44 is provided therein with a plurality of stepped portions. Specifically, the heart-shaped cam groove 44 is provided with an initial engagement section 44a, a push-insertion passage section 44b, a holding section 44c and a return passage section 44d. The initial engagement section 44a forms the rear of the heart-shaped cam groove 44 and extends linearly in the forward/rearward direction. The push-insertion passage section 44b is positioned on the left-hand side of the heart-shaped protrusion 45, the holding section 44c is positioned in front of the heart-shaped protrusion 45, and the return passage section 44d is positioned on the right-hand side of the heart-shaped protrusion 45.

The slider body 41 is provided on a left half of the rear thereof with a spring support shaft 46 having a cylindrical-columnar shape which extends rearward. The slider body 41 is provided at the right end of the contact terminal 43 with a card contact portion 49 that constitutes a flat surface which is inclined to the forward/rearward direction in a plan view.

The reinforcing member 50 is made of metal and fixedly mounted to the rear of the slider body 41.

Figure 9:
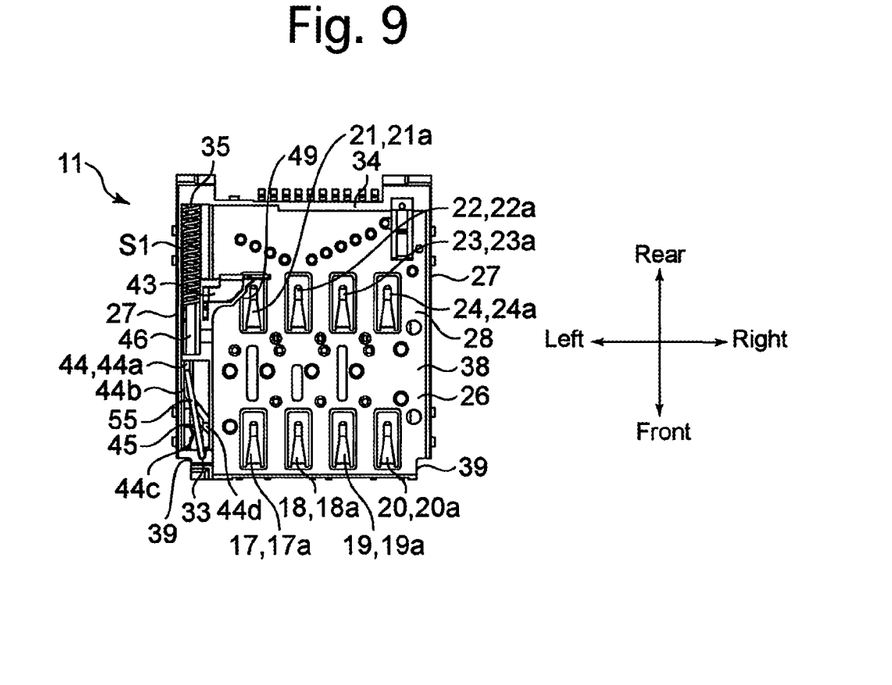
FIG. 9 is a plan view of the first connector with a first upper housing thereof removed.
Figure 10:
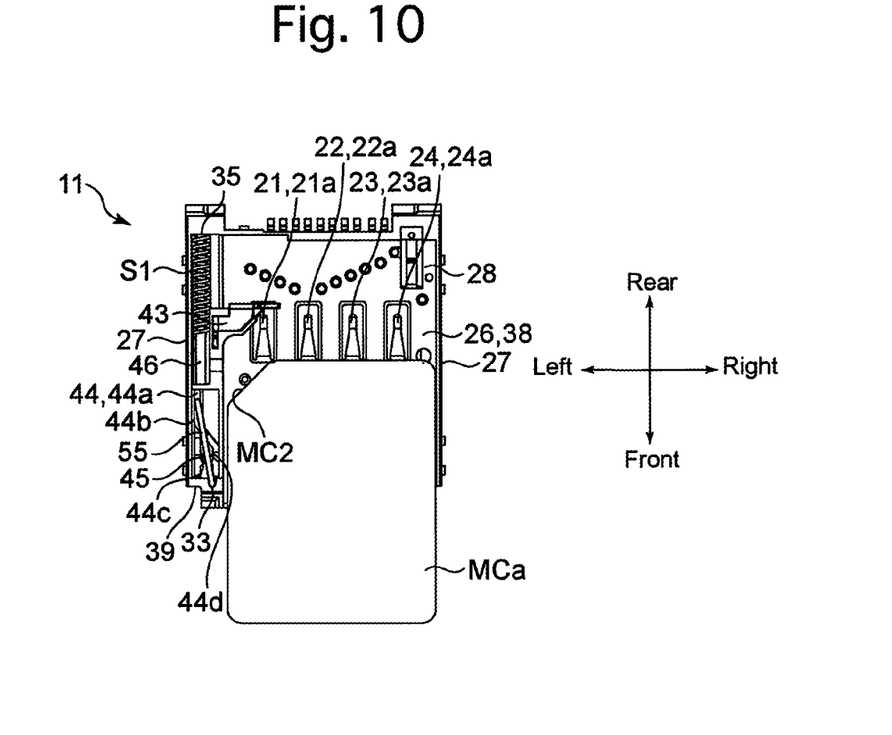
FIG. 10 is a plan view of the first connector and the first memory card with the first upper housing removed, showing a state shortly after the commencement of insertion of the first memory card into the first connector.
Figure 11:
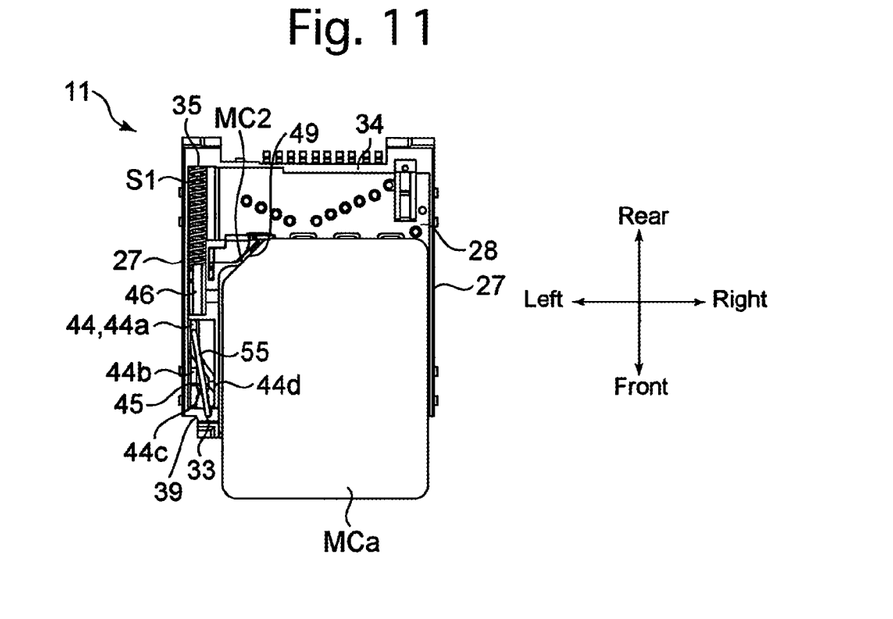
FIG. 11 is a view similar to that of FIG. 10, showing the first connector and the first memory when the first memory card comes into contact with a card contact portion of a slider body located at an initial position thereof.
Figure 12:
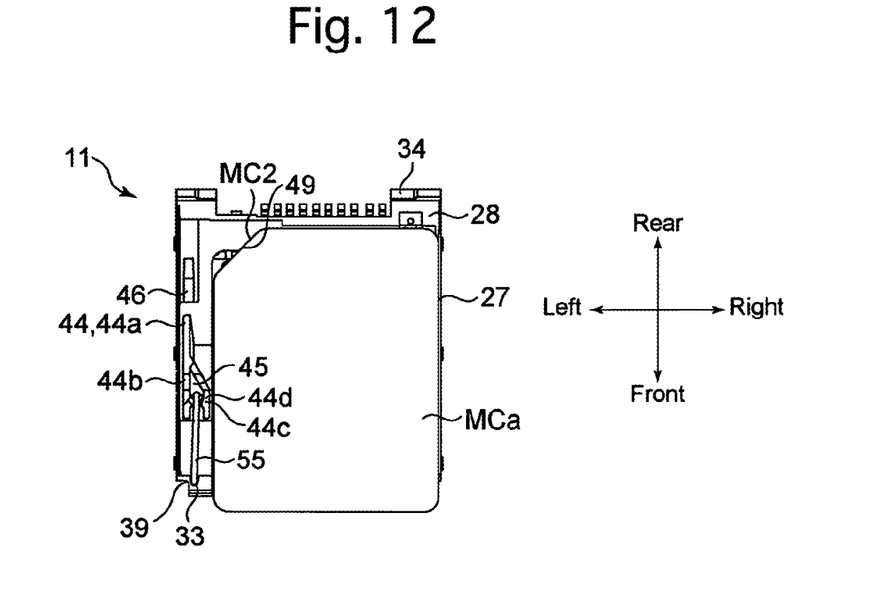
FIG. 12 is a view similar to that of FIG. 10, showing the first connector and the first memory card when a slider of the first connector has slid to a push-inserted position.
Figure 13:
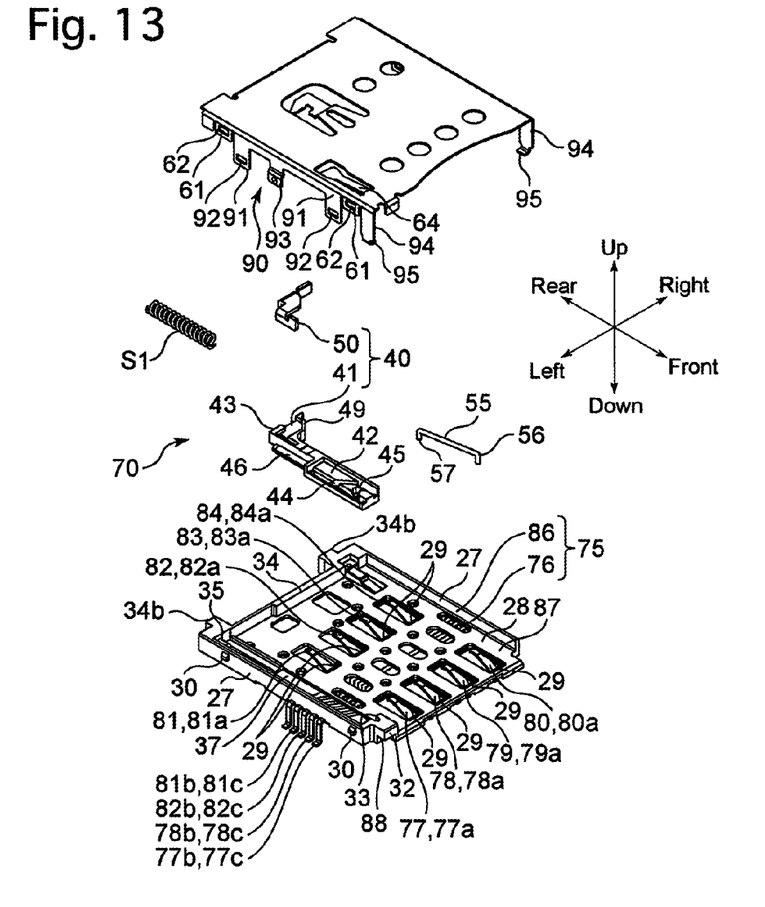
FIG. 13 is an exploded front perspective view of a second connector, viewed obliquely from above.

The slider 40 is slidable on the first lower housing 15 in the forward/rearward direction along the slide groove 37 between the initial position shown in FIGS. 9, 10 and 11 and the pushed-in position shown in FIG. 12. In addition, the compression coil spring S1 is installed in a compressed state (resiliently deformed state) (in which the compression coil spring S1 becomes smaller in length than that in a free state) between the rear end of the slider 40 and the left side portion of the rear wall 34. The spring support shaft 46 is inserted into the front of the compression coil spring S1, and the rear end of the compression coil spring S1 is engaged with the spring support projection 35. Accordingly, a forward spring force is continuously exerted on the slider 40 from the compressing coil spring S1, so that the slider 40 is in the initial position thereof when no external force other than the spring force of the compression coil spring S1 is exerted on the slider 40.

The cam bar 55 is made of metal and links the first lower housing 15 and the slider body 41 with each other. The cam bar 55 is provided at the front and rear ends thereof with a front-end engaging projection 56 and a rear-end engaging projection 57, respectively, each of which is bent downward. The front-end engaging projection 56 is rotatably engaged with the cam-bar support groove 33 of the first lower housing 15 (the cam-bar support portion 32), and the rear-end engaging projection 57 is engaged with the heart-shaped cam groove 44 of the slider body 41 to be movable relative to the heart-shaped cam groove 44.

The top of the first lower housing 15 that accommodates the slider 40, the cam bar 55 and the compression coil spring S1 is covered by the first upper housing 60.

The first upper housing 60 is a press-formed product made of a metal plate. The first upper housing 60 is provided on each of the left and right sides thereof with a front and rear pair of lugs 61, and is provided, between the front and rear pair of lugs 61 on each of the left and right sides of the first upper housing 60, with a first conduction lug 63. The front and rear pair of lugs 61 and the first conduction lug 63 on each of the left and right sides of the first upper housing 60 are each formed to project downward. A locking hole 62 is formed in each lug 61. The first upper housing 60 is mounted to the first lower housing 15 by engaging the locking hole 62 of each lug 61 of the first upper housing 60 with the corresponding upper-cover locking projection 30 of the first lower housing 15. The first upper housing 60 is provided in the vicinity of the front left corner thereof with a cam-bar-biasing leaf spring 64 which is formed at the time of formation of the first upper housing 60 by press-forming. The cam-bar-biasing leaf spring 64 is a cantilever leaf spring which extends obliquely rearwardly downwards from the base end (front end) thereof. When in a free state, the cam-bar-biasing leaf spring 64 is positioned below the undersurface of the first upper housing 60. Accordingly, since the cam-bar-biasing leaf spring 64 continuously biases the cam bar 55 toward the bottom side of the first lower housing 15 (downward), the engaged state of the front-end engaging projection 56 of the cam bar 55 with the cam-bar support groove 33 and the engaged state of the rear-end engaging projection 57 of the cam bar 55 with the heart-shaped cam groove 44 are maintained at all times.

The detailed structure of the second connector 70 will be discussed hereinafter.

The second connector 70 is provided with a second lower housing (second housing) 75, a slider 40, a cam bar 55, a second upper housing (second housing) 90 and a compression coil spring S1. The second connector 70 is substantially identical in planar shape to the first connector 11.

The second lower housing 75 is substantially rectangular in a plan view and formed as a integrally-formed product including a second metal member 76 and a second insulator 86.

Figure 14:
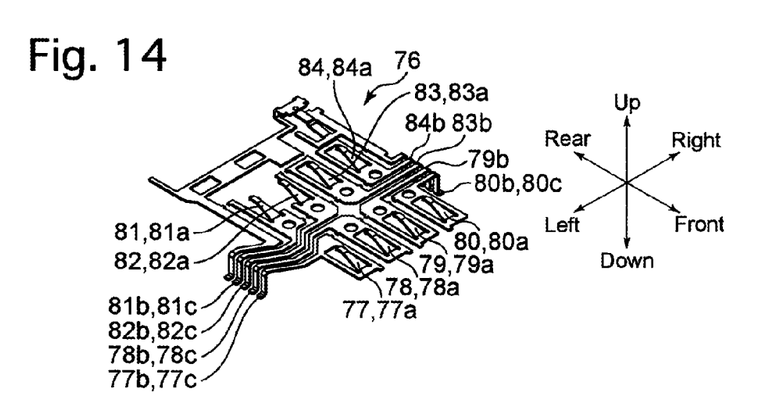
FIG. 14 is a front perspective view of a second metal member provided as an element of the second connector, viewed obliquely from above.

As shown in FIG. 14, the second metal member 76 is provided with eight second contacts 77, 78, 79, 80, 81, 82, 83 and 84, and the eight second contacts 77, 78, 79, 80, 81, 82, 83 and 84 are integrally provided with eight second contact leaves 77a, 78a, 79a, 80a, 81a, 82a, 83a and 84a and eight second tails 77b, 78b, 79b, 80b, 81b, 82b, 83b and 84b, respectively. As shown in the drawings, the second tails 77b, 78b, 81b and 82b extend leftward from the second metal member 76, while the second tails 79b, 80b, 83b and 84b extend rightward from the second metal member 76. The ends (lower ends) of the eight second tails 77b, 78b, 79b, 80b, 81b, 82b, 83b and 84b constitute eight second mounting portions 77c, 78c, 79c, 80c, 81c, 82c, 83c and 84c that are located one step down from the portions adjacent to the eight second tails 77b, 78b, 79b, 80b, 81b, 82b, 83b and 84b, respectively.

The second insulator 86 is integrated with the second metal member 76 by performing outsert molding on the second metal member 76 in a mold not shown in the drawings. The second insulator 86 is provided with left and right side walls 27, a bottom-forming portion 28, contact exposing holes 29, upper-cover lock projections 30, a cam-bar support portion 32, a cam-bar support groove 33, a rear wall 34, a spring support projection 35, a slide groove 37, and a second storage slot (storage section) 87 which corresponds to the first storage slot 38. The second insulator 86 is further provided in the vicinity of the left and right ends of the rear wall 34 with a pair of second positioning projections 34b, respectively, which project rearward. The second insulator 86 is further provided at the front left corner of the lower surface thereof with a front-side positioning recess 88.

As shown in the drawings, the second insulator 86 is substantially rectangular in shape in a plan view, the outer sides of the left and right side walls 27 are parallel to each other, and the rear surface of the rear wall 34 is orthogonal to the left and right side walls 27. The second tails 77b, 78b, 81b and 82b (the four second mounting portions 77c, 78c, 81c and 82c) of the four second contacts 77, 78, 81 and 82 are positioned on the outer peripheral side of the outer side surface (second side surface) of the left side wall 27 in a plan view (as viewed in the direction of thickness of the second connector 70). On the other hand, the second tails 79b, 80b, 83b and 84b (the four second mounting portions 79c, 80c, 83c and 84c) of the remaining four second contacts 79, 80, 83 and 84 are positioned on the outer peripheral side of the outer side surface (second side surface) of the right side wall 27 in a plan view (as viewed in the direction of thickness of the second connector 70).

The slider 40, the cam bar 55 and the compression coil spring S1 are mounted to the second lower housing 75 in a similar manner to the first lower housing 15.

The top of the second lower housing 75 that accommodates the slider 40, the cam bar 55 and the compression coil spring S1 is covered by the second upper housing 90.

The second upper housing 90 is a press-formed product made of a metal plate. The second upper housing 90 is provided on each of the left and right sides thereof with a front and rear pair of lugs 61, a front and rear pair of connector coupling lugs 91 which are formed between the front and rear pair of lugs 61, and a second conduction projection 93 which is formed between the front and rear pair of connector coupling lugs 91. Furthermore, the second upper housing 90 is provided on its rear side with a connector coupling lug 91. The front and rear pair of lugs 61, the front and rear pair of connector coupling lugs 91 and the second conduction projection 93 on each of the left and right sides of the second upper housing 90 are each projected downward. A connector coupling hole 92 is formed in each connector coupling lug 91. In addition, the second upper housing 90 is provided at the front ends of the left and right sides of the second upper housing 90 with left and right ground lugs 94, respectively, which extend downward to a position below the lugs 61, the connector coupling lugs 91 and the second conduction projection 93, and a ground tail 95 which extends horizontally inwards is formed at the end (lower end) of each ground lug 94. The second upper housing 90 is mounted to the second lower housing 75 by engaging the locking hole 62 of each lug 61 of the second upper housing 90 with the corresponding upper-cover locking projection 30 of the second lower housing 75. When the second upper housing 90 is mounted to the second lower housing 75, the second mounting portions 77c through 84c of the eight second contacts 77 through 84 and the ground tail 95 of each ground lug 94 substantially lie in a plane. When in a free state, the cam-bar-biasing leaf spring 64 of the second upper housing 90 is also positioned below the undersurface of the second upper housing 90. Accordingly, since the cam-bar-biasing leaf spring 64 of the second upper housing 90 continuously biases the cam bar 55 toward the bottom side of the second lower housing 75 (downward), the engaged state of the front-end engaging projection 56 of the cam bar 55 with the cam-bar support groove 33 and the engaged state of the rear-end engaging projection 57 of the cam bar 55 with the heart-shaped cam groove 44 are maintained at all times.

The first connector 11 and the second connector 70 that have been described above can be integrated by engaging the connector coupling hole 92 of each connector coupling lug 91 of the second upper housing 90 with the corresponding connector coupling lug 31 of the first lower housing 15 with the top of the first connector 11 being covered by the second connector 70, with the outer sides of the left and right second positioning projections 34b being brought in contact with the inner sides of the left and right first positioning projections 34a, with the front-side positioning projection 39a being engaged in the front-side positioning recess 88, and with the positions of the front side, the rear side and the left and right sides of the second connector 70 being made coincident with the positions of the front side, the rear side and the left and right sides of the first connector 11 (with the front side, the rear side and the left and right sides of the second connector 70 being made parallel with the front side, the rear side and the left and right sides of the first connector 11), and the memory card connector 10 is completed by integrating the first connector 11 and the second connector 70 in such manner. When the first connector 11 and the second connector 70 are integrated, the bottom of the second insulator 86 of the second connector 70 comes in contact with the upper surface of the first upper housing 60. However, as shown in FIG. 5, since the second metal member 76 of the second connector 70, except the eight second contacts 77 through 84 thereof, is positioned inside of the second insulator 86 (i.e., not exposed through the bottom surface of the second insulator 86), there is no possibility of the second metal member 76 and the first upper housing 60 being short-circuited with each other.

In addition, the left and right second conduction projections 93 of the second connector 70 are engaged with (come in contact with) the left and right first conduction lugs 63 of the first connector 11 from the outside, respectively.

Additionally, the left and right ground lugs 94 are positioned inside the clearance recess 39, and the second mounting portions 77c through 84c of the eight second contacts 77 through 84 of the second connector 70 and the ground tails 95 of the left and right ground lugs 94 of the second connector 70 substantially lie in a plane in which the first mounting portions 17c through 24c of the eight first contacts 17 through 24 lie.

Figure 1:
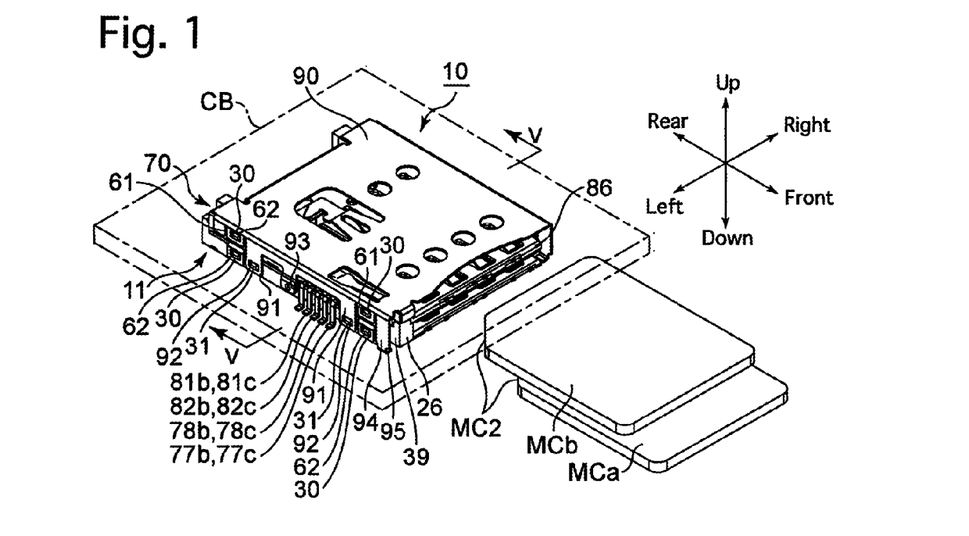
FIG. 1 is a front perspective view of an embodiment of a connector (memory card connector), a circuit board, a first memory card and a second memory card, viewed obliquely from above.
Figure 2:
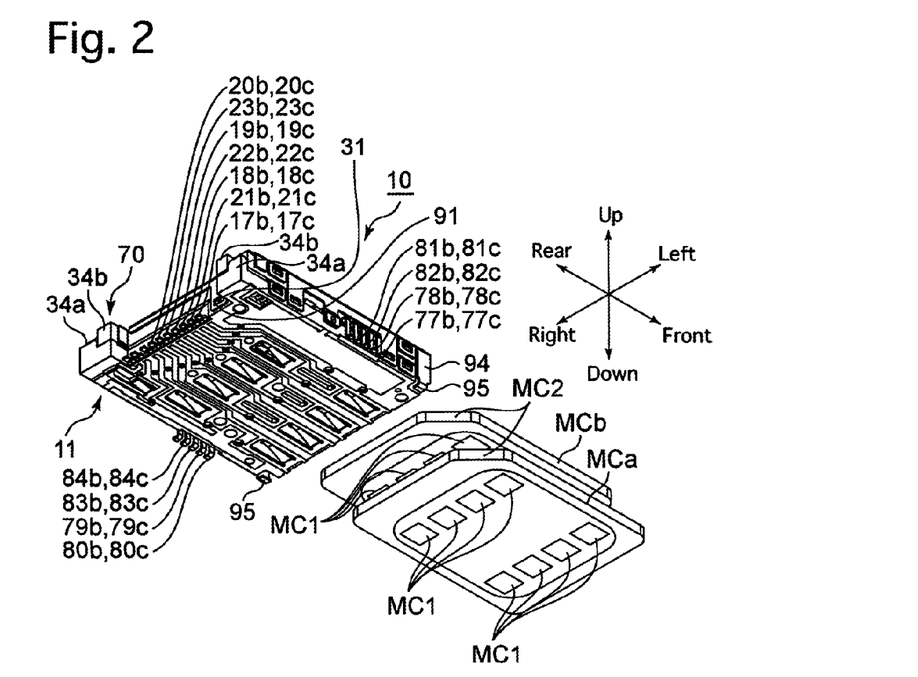
FIG. 2 is a rear perspective view of the memory card connector, the first memory card and the second memory card, viewed obliquely from below.
Figure 3:
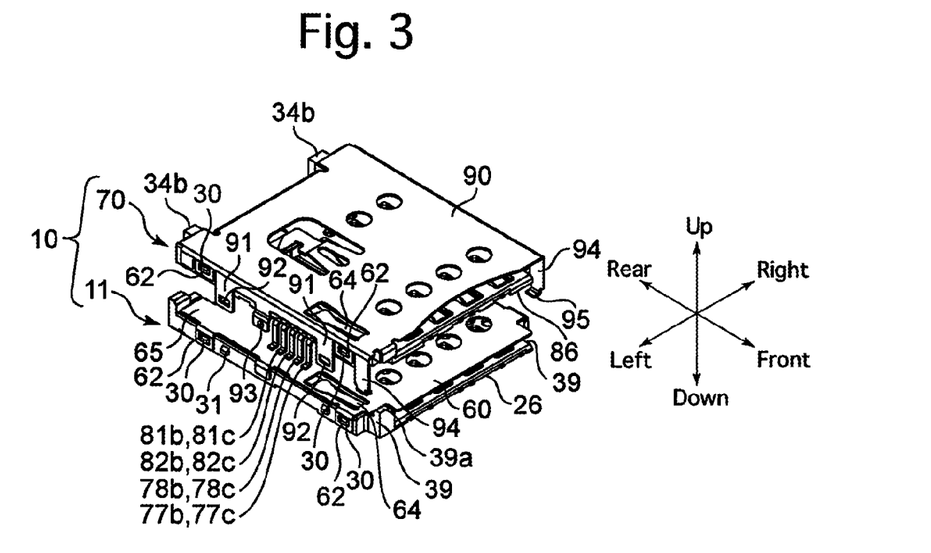
FIG. 3 is an exploded front perspective view of the memory card connector, viewed obliquely from above.
Figure 4:
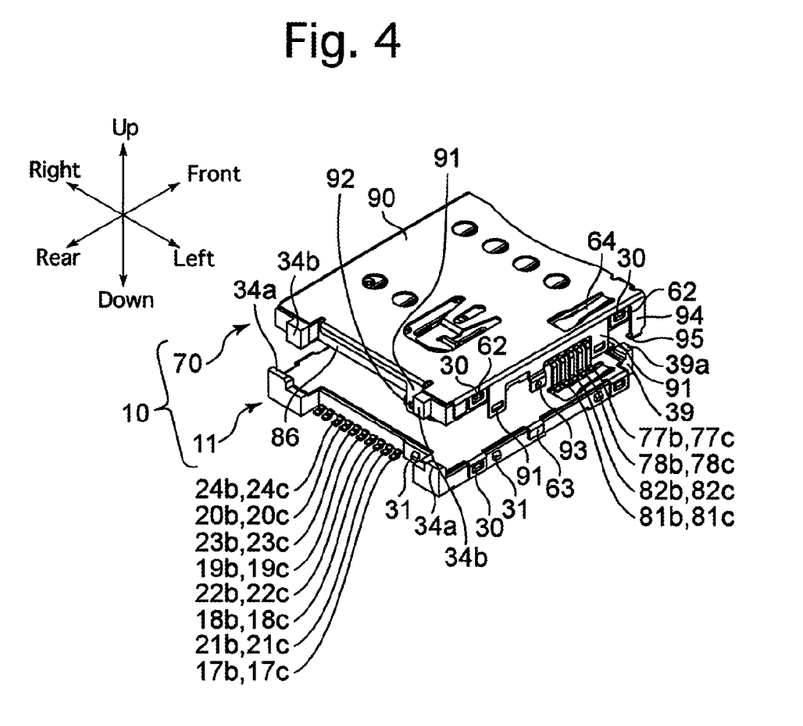
FIG. 4 is an exploded rear perspective view of the memory card connector, viewed obliquely from above.
Figure 5:
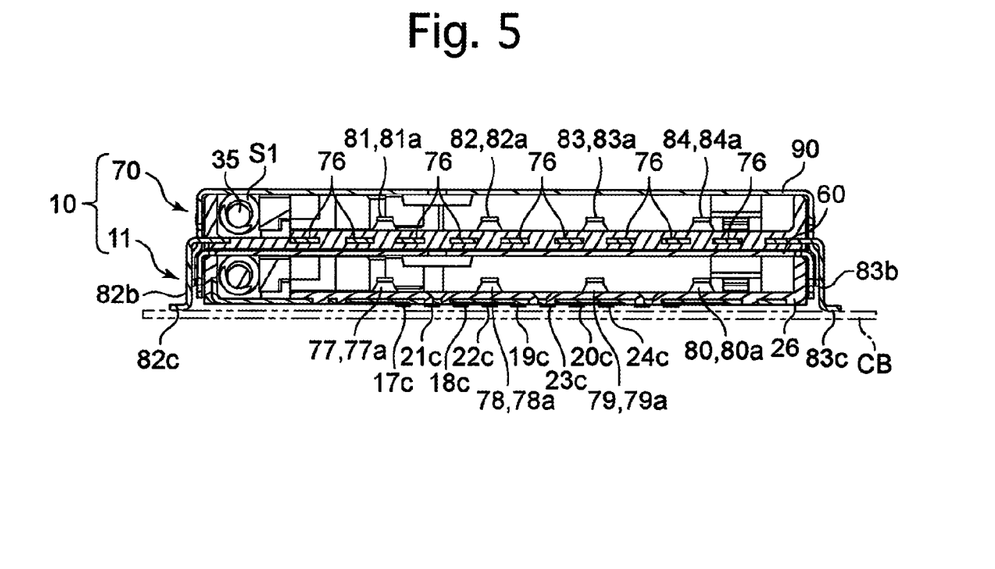
FIG. 5 is a cross sectional view taken along the line V-V shown in FIG. 1.
Figure 6:
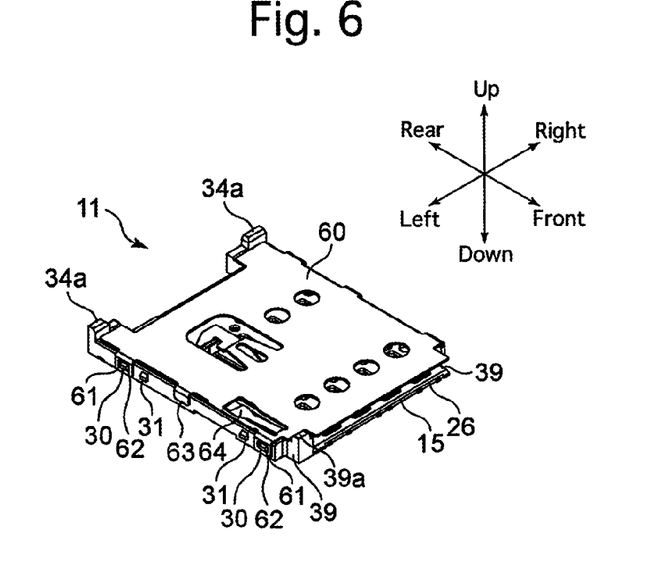
FIG. 6 is a front perspective view of a first connector, viewed obliquely from above.
Figure 7:
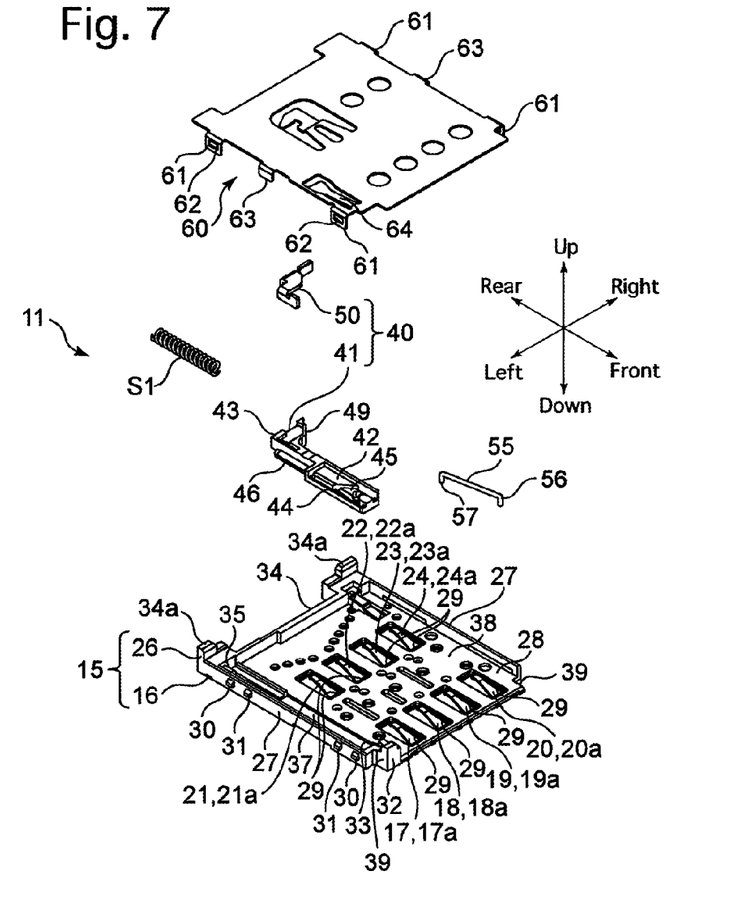
FIG. 7 is an exploded perspective view of the first connector, viewed obliquely from above.

The memory card connector 10 is mounted on a top surface (circuit formation surface) of a circuit board CB (shown by one-dot chain lines in FIGS. 1 and 5). Specifically, the memory card connector 10 is temporarily lifted by vacuum holding the top surface of the second upper housing 90 by a vacuum machine (not shown) positioned above the memory card connector and subsequently by moving this vacuum machine upward. Subsequently, after the memory card connector 10 is moved by the vacuum machine to a position above a circuit pattern (not shown) formed on the top surface of the circuit board CB, the first mounting portions 17c through 24c of the eight first contacts 17 through 24 and the second mounting portions 77c through 84c of the eight second contacts 77 through 84 are mounted onto solder paste that has been applied onto the circuit pattern of the circuit board CB while the positions of the first mounting portions 17c through 24c and the second mounting portions 77c through 84c are visually checked by an image recognizer (not shown), and the ground tail 95 of each ground lug 94 is mounted onto solder paste that has been applied onto a ground pattern (not shown) of the circuit board CB to which. Subsequently, each application of solder paste is melted by heat in a reflow furnace. Thereupon, the first mounting portions 17c through 24c and the second mounting portions 77c through 84c are soldered to the circuit pattern while the left and right ground tails 95 are soldered to the ground pattern.

Operations of the memory card connector 10 that has the above described structure when the first memory card MCa and the second memory card MCb are inserted into and removed from the memory card connector 10 will be discussed hereinafter.

Each of the first memory card MCa and the second memory card MCb is provided on the bottom surface thereof with eight terminals MC1. In addition, each of the first memory card MCa and the second memory card MCb is provided at one of the four corners (specifically the rear left corner) thereof with a cut-off corner MC2 which is formed along a straight line that extends substantially orthogonal to a diagonal line passing through this corner.

In a state where the first memory card MCa is not inserted into the first connector 11, due to the biasing force of the compression coil spring S1 the slider 40 is in the initial position while the rear-end engaging projection 57 of the car bar 55 is engaged with the initial engagement section 44a of the heart-shaped cam groove 44 (see FIGS. 9 through 11).

In this state, inserting the first memory card MCa in a normal (correct) orientation (in which the terminals MC1 face downward and the cut-off corner MC2 becomes the rear left corner of the first memory card MCa) into the first storage slot 38 from a front opening (insertion slot) formed in the front thereof (see FIG. 10) and further pushing the first memory card MCa rearward causes the cut-off corner MC2 to come into contact with the card contact portion 49 of the slider body 41 (the contact terminal 43), thus causing the first memory card MCa and the slider 40 to integrate with each other (see FIG. 11).

From this state, pushing the first memory card MCa further rearward causes the slider 40 to slide rearward against the biasing force of the compression coil spring S1 (while resiliently deforming the compression coil spring S1 in a direction to compress the compression coil spring S1; the compression coil spring S1 is omitted in FIG. 12), thus causing the rear-end engaging projection 57 of the cam bar 55 that was engaged with a central portion of the initial engagement section 44a to move rearwardly to the front of the initial engagement section 44a and to the push-insertion passage section 44b (i.e., causing the rear-end engaging projection 57 of the cam bar 55 to be engaged with the front of the initial engagement section 44a and the push-insertion passage section 44b in that order). Subsequently, upon the rear-end engaging projection 57 of the cam bar 55 moving to the front end of the push-insertion passage section 44b (i.e., to a portion of the push-insertion passage section 44b which is positioned in front of the heart-shaped protrusion 45), the slider 40 reaches the push-inserted position (see FIG. 12).

When the rearward pressure force against the first memory card MCa is released after the slider 40 reaches the push-inserted position, the holding section 44c of the slider body 41 that is pressed (returned) forward by the biasing force of the compression coil spring S1 is engaged with the rear-end engaging projection 57 of the cam bar 55, so that the slider 40 is held in the push-inserted position (i.e., the slider 40 is prevented from sliding forward). Upon the slider 40 reaching the push-inserted position, the eight terminals MC1 of the first memory card MCa come into contact with the associated eight first contacts 17 through 24 (the eight first contact leaves 17a through 24a), respectively, thus causing the first memory card MCa that is inserted into the first connector 11 and the circuit board CB to establish electrical continuity therebetween via the eight first contacts 17 through 24 (the first mounting portions 17c through 24c).

With the slider 40 held in the push-inserted position, the first memory card MCa is again pushed rearward against the biasing force of the compression coil spring S1, and the rearward pressure force against the first memory card MCa is released, thereupon the forward biasing force of the compression coil spring S1 causes the rear-end engaging projection 57 to move rearward away from the holding section 44c, thereafter move toward the return passage section 44d (to be engaged therewith) and automatically move to a central portion of the initial engagement section 44a via the return passage section 44d. Consequently, the slider 40 returns to the initial position (see FIG. 11). Accordingly, the first memory card MCa can be manually pinched and pulled out forward from the memory card connector 10.

The second memory card MCb can be inserted into and removed from the second connector 70 in the same manner as the first connector 11 because the second connector 70 has the same internal structure as the first connector 11 (i.e., because the slider 40, the cam bar 55 and the compression coil spring S1 are installed to the second lower housing 75 in a similar manner to the first lower housing 15).

Since the memory card connector 10 is provided with the first connector 11 and the second connector 70 that are superposed on each other in the vertical direction as described above, the first memory card MCa and the second memory card MCb can be inserted into the memory card connector 10 to be connected therewith. Accordingly, if the memory card connector 10 is incorporated in a mobile phone (mobile device) and if the first memory card MCa (that serves as a micro-SIM card) and the second memory card MCb (that serves as a micro-SIM card) are inserted into the memory card connector 10, two different phone numbers can be selectively used on a single mobile phone.

The first tails 17b through 24b (the first mounting portions 17c through 24c) of the eight first contacts 17 through of the first connector 11 are positioned on the outer peripheral side of (positioned behind) the first side surface of the first lower housing 15 (the rear surface of the rear wall 34), which serves as one side of the first lower housing 15, as viewed in the direction of thickness of the first connector 11 (as viewed in the vertical direction), while the second tails 77b through 84b (the second mounting portions 77c through 84c) of the eight second contacts 77 through 84 of the second connector 70 are positioned on the outer peripheral sides (the left-hand side and the right-hand side of the left side wall 27) of the second side surfaces (the outer surfaces of the left and right side walls 27), of the second lower housing 75, which are located at different positions (in different direction) from the aforementioned first side surface.

Accordingly, the pitch (distance) between the first tails 17b through 24b (the first mounting portions 17c through 24c) and the pitch (distance) between the second tails 77b through 84b (the second mounting portions 77c through 84c) can be made (relatively) wide. Therefore, images (positions) of the first tails 17b through 24b and the second tails 77b through 84b are easily recognized by an image recognizer, and the occurrence of short-circuiting between adjacent tails via soldering can be prevented, and accordingly, defective soldering and short-circuiting do not easily occur between each of the first and second tails and the circuit board CB.

Additionally, since the first tails 17b through 24b (the first mounting portions 17c through 24c) and the second tails 77b through 84b (the second mounting portions 77c through 84c) are mounted on the circuit board CB at different positions (are not alternately arranged), the first tails 17b through 24b and the second tails 77b through 84b are not influenced by each other. This makes it relatively easy to make alignment adjustments for the first tails 17b through 24b and the second tails 77b through 84b with respect to the circuit board CB, thus reducing the possibility of defective soldering occurring between each of the first and second tails and the circuit board CB.

Additionally, since the first tails 17b through 24b and the second tails 77b through 84b are not alternately arranged, the pitch (distance) between the first tails 17b through 24b (the first mounting portions 17c through 24c) and the pitch (distance) between the second tails 77b through 84b (the second mounting portions 77c through 84c) do not become narrow even if the memory card connector 10 is small in size.

Therefore, according to the present embodiment of the memory card connector, the mountability of the first mounting portions 17c through 24c of the first connector 11 and the second mounting portions 77c through 84c of the second connector to the circuit board CB is favorable even when the memory card connector 10 is small in size.

As viewed in the direction of thickness of the memory card connector 10, the first tails 17b through 24b (the first mounting portions 17c through 24c) of the first contacts 17 through 24 and the second tails 77b through 84b (the second mounting portions 77c through 84c) of the second contacts 77 through 84 are located at different positions (the first tails 17b through 24b and the second tails 77b through 84b are not alternately arranged in either the forward/rearward direction or the leftward/rightward direction), therefore, it is not necessary for one of each first tail 17b through 24b and each second tail 77b through 84b to be formed into a complicated shape (e.g., a crank shape).

Additionally, the four second tails 77b, 78b, 81b and 82b on the left side of the second connector 70 and the four second tails 79b, 80b, 83b and 84b on the right side of the second connector 70 are positioned on the left and right sides of the first connector 11, respectively (so that the second connector 70 holds the first connector 11) and are soldered (and fixed) to the circuit pattern on the circuit board CB. Accordingly, since the second connector 70 (the four second tails 77b, 78b, 81b and 82b on the left side of the second connector 70 and the four second tails 79b, 80b, 83b and 84b on the right side of the second connector 70) is mounted on the circuit board CB at two positions different from the position of the first connector 11 (the first mounting portions 17c through 24c), the mounting strength of the second connector 70 to the circuit board CB is great. Therefore, even if the first memory card MCa is forcibly inserted into and removed from the first connector 11 with an excessive force or even if the locking apparatus (which consists of the connector coupling projections 31 and the connector coupling holes 92 of the connector coupling lugs 91) is omitted, the possibility of the first connector 11 being peeled off the circuit board CB is small (compared with the case where the first connector 11 is solely mounted on the circuit board CB).

Additionally, since the first tails 17b through 24b (the first mounting portions 17c through 24c) of the eight first contacts 17 through 24 and the second tails 77b through 84b (the second mounting portions 77c through 84c) of the eight second contacts 77 through 84 can be soldered to the circuit pattern of the circuit board CB in a state where the first connector 11 and the second connector 70 are integrated via the locking apparatus (which consists of the connector coupling projections 31 and the connector coupling holes 92 of the connector coupling lugs 91), the memory card connector 10 (the first connector 11 and the second connector 70) can be mounted to the circuit board CB by a single soldering operation.

Additionally, since the first upper housing 60 and the second upper housing 90 are connected via the first conduction lug 63 and the second conduction projection 93 and also since the left and right ground lugs 94 (the ground tails 95 thereof) are electrically connected to a ground pattern (not shown) on the circuit board CB, electrical noise can be prevented from entering the first contacts 17 through 24 and the second contacts 77 through 84, or noise caused at the first contacts 17 through 24 and the second contacts 77 through 84 can be prevented from leaking outside. Additionally, in the case where the worker/technician who inserts and removes the first memory card MCa and the second memory card MCb into and from the memory card connector 10 is charged with static electricity, this static electrical charge can be released to the ground pattern on the circuit board CB via the first upper housing 60 and the second upper housing 90, and accordingly, the apparatus to which the connector 10 is installed, the first memory card MCa and the second memory card MCb can be prevented from being damaged by static electricity.

Although the present invention has been described based on the above illustrated embodiment of the memory card connector, the present invention is not limited solely to this particular embodiment; various modifications to the above illustrated embodiment of the memory card connector are possible.

For instance, the present invention can also be applied to a memory card connector into which memory cards (e.g., micro-SD cards, SIM cards, etc.) other than micro-SIM cards (the first memory card MCa and the second memory card MCb) are removably insertable.

Additionally, the memory card connector 10 can be mounted to an apparatus (electronic device) other than a mobile device (e.g., a personal computer, a digital camera, or a digital video camera, etc.).

Additionally, the first connector 11 (the first lower housing 15 and the first upper housing 60) and the second connector 70 (the second lower housing 75 and the second upper housing 90) can be square in a plan view, rather than rectangular in a plan view.

Additionally, in either case where the first connector (the first lower housing 15 and the first upper housing 60) and the second connector 70 (the second lower housing 75 and the second upper housing 90) are formed into a rectangular or square shape in a plan view, all the four corners of each connector can be exact right-angles, or non right-angles like the above described embodiment.

Additionally, the overall dimensions of the first connector 11 (the first lower housing 15 and the first upper housing 60) and the second connector 70 (the second lower housing 75 and the second upper housing 90) can be altered. For instance, the second connector 70 (the second lower housing 75 and the second upper housing 90) can be reduced in size compared with the first connector 11 (the first lower housing 15 and the first upper housing 60). However, in this case also, the four sides of the first connector 11 (the first lower housing 15 and the first upper housing 60) and the four sides of the second connector 70 (the second lower housing 75 and the second upper housing 90) can be made parallel with each other, respectively.

It is possible for the first tails (first mounting portions) of the first connector 11 to be arranged separately on the left and right sides of the first housing and that the second tails (second mounting portions) of the second connector 70 be arranged only behind the second housing.

It is possible for the second tails (second mounting portions) of the second connector 70 to be arranged only on the left or right side of the second housing with the first connector 11 remaining unchanged as in the above described embodiment. In addition, it is possible for the first tails (first mounting portions) of the first connector 11 to be arranged only on the left or right side of the first housing while the second tails (second mounting portions) of the second connector 70 be arranged only behind the second housing.

Additionally, it is possible that the slider 40, the cam bar 55 and the compression coil spring S1 be omitted from at least one of the first connector 11 and the second connector 70. In this case, it is possible that substitutions for the slider 40, the cam bar 55 and the compression coil spring S1 be provided or not provided.

As an example of a substitution for the slider 40, the cam bar 55 and the compression coil spring S1, it is possible to provide, e.g., a tray which is installed in either housing to be freely slidable. A memory card can be mounted on the tray when the tray is drawn out from the inside of the housing, and the tray on which the memory card is mounted can be pushed back into the housing. Upon the tray on which the memory card is mounted being pushed back into the housing, terminals of the memory card come into contact with contacts fixed to the housing through through-holes formed in the bottom of the tray.

Additionally, it is possible to form holes corresponding to the connector coupling holes 92 on the first connector 11 side and to form projections corresponding to the connector coupling projections 31 on the second connector 70 side.

Additionally, the housing of at least one of the first connector 11 and the second connector 70 can be formed as a single member.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A memory card connector comprising:
a first connector including a first housing having one of a square and rectangular shape and provided with a first storage section, into which a first memory card is removably insertable, and first contacts which are electrically connected with terminals of said first memory card inserted into said first storage section; and
a second connector including a second housing having one of a square and rectangular shape and provided with a second storage section, into which a second memory card is removably insertable, and second contacts which are electrically connected with terminals of said second memory card inserted into said second storage section,
wherein said circuit board, said first connector and said second connector are superposed in that order in a direction of thickness thereof,
wherein said first storage section and said second storage section are provided with a first opening and a second opening which are formed in surfaces of said first housing and said second housing on a common side, respectively, said first memory card and said second memory card being removably insertable into said first storage section and said second storage section through said first opening and said second opening, respectively, wherein each said first contacts includes a first tail which is mountable to a circuit board and which is positioned on an outer peripheral side of a first side surface that serves as one side of said first housing as viewed in said thickness direction, wherein said second housing includes a second side surface which is located at a different position from said first side surface as viewed in said thickness direction, wherein each said second contacts includes a second tail which is mountable to said circuit board and which is positioned on an outer peripheral side of said second side surface as viewed in said thickness direction, wherein said first housing is provided with said first side surface at a different position from said first opening as viewed in said thickness direction, and wherein a pair of said second side surfaces, of said second housing, are located at different positions from said first and second openings and said first side surface as viewed in said thickness direction.

2. The memory card connector according to claim 1, further comprising a locking apparatus which engages with both said first housing and said second housing to hold said first connector and said second connector in a mutually superposed state.

3. The memory card connector according to claim 2, wherein said locking apparatus comprises a first pair of coupling lugs provided on one of said pair of second side surfaces and a second pair of coupling lugs provided on the other of said pair of second side surfaces, wherein said first pair of coupling lugs is provided on either side of said group of said second contacts, and wherein said second pair of coupling lugs is provided on either side of said remaining group of said second contacts.

4. The memory card connector according to claim 1, wherein said memory card connector is incorporated in an electronic device.

5. The memory card connector according to claim 1, wherein the second tails of a group of said second contacts are arranged to project outwardly from one of said pair of said second side surfaces, in a plan view, and wherein the second tails of a remaining group of said second contacts, other than said group of said second contacts, are arranged to project outwardly from the other of said pair of said second side surfaces, in a plan view.

6. The memory card connector according to claim 1, wherein said pair of said second side surfaces constitute a pair of side surfaces that are provided on either side of said first opening and said second opening, in a front elevational view of said first opening and said second opening.

\* \* \* \* \*